United States Patent
Park et al.

(10) Patent No.: US 8,521,214 B1
(45) Date of Patent: Aug. 27, 2013

(54) CHANNEL CONDITION BASED SIGNAL QUALITY FEEDBACK BANDWIDTH ALLOCATION

(75) Inventors: Sungki Park, Ashburn, VA (US); Masoud Olfat, Great Falls, VA (US); Dhaval Dipak Mehta, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/475,192

(22) Filed: May 18, 2012

Related U.S. Application Data (62) Division of application No. 12/537,973, filed on Aug. 7, 2009, now Pat. No. 8,204,448.

(51) Int. Cl.
 *H04B 7/00* (2006.01)

(52) U.S. Cl.
 USPC ............... 455/522; 455/69; 455/70; 455/448; 455/449; 455/450; 370/315; 370/316; 370/317; 370/318; 370/319

(58) Field of Classification Search
 USPC ...... 455/522, 69–70, 444–455; 370/315–320
 See application file for complete search history.

(56) References Cited

U.S. PATENT DOCUMENTS

| | | | |
|---|---|---|---|
| 8,018,911 | B2 | 9/2011 | Yoon et al. |
| 2005/0143084 | A1 | 6/2005 | Cheng et al. |
| 2006/0250963 | A1 | 11/2006 | Jin et al. |
| 2007/0254595 | A1 | 11/2007 | Yoon et al. |
| 2008/0075038 | A1 | 3/2008 | Jin et al. |
| 2008/0214198 | A1* | 9/2008 | Chen et al. ............... 455/450 |
| 2011/0143766 | A1* | 6/2011 | Sun et al. ............... 455/452.2 |
| 2011/0305218 | A1 | 12/2011 | Yoon et al. |

OTHER PUBLICATIONS

Wimax Forum, "Mobile WiMAX—Part I: A Technical Overview and Performance Evaluation," Aug. 2006, pp. 1-53.

\* cited by examiner

*Primary Examiner* — Fayyaz Alam
(74) *Attorney, Agent, or Firm* — O'Brien Jones, PLLC (57) ABSTRACT

A first amount of bandwidth is allocated to a first wireless device to send signal quality information to a base station. Based on a first indicator of wireless link conditions associated with the first wireless device, and a second indicator of wireless link conditions associated with a second wireless device, a second amount of bandwidth is allocated to the first wireless device to send signal quality information to the base station.

8 Claims, 8 Drawing Sheets

CHANNEL CONDITION BASED SIGNAL QUALITY FEEDBACK BANDWIDTH ALLOCATION

This application is a division of prior application Ser. No. 12/537,973, filed Aug. 7, 2009 (currently in condition for allowance), which is hereby incorporated by reference.

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). This and certain other ITU standards may be known as the CDMA2000 group of standards. The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of allocating signal quality feedback bandwidth is disclosed. A first amount of bandwidth is allocated to a first wireless device to send signal quality information to a base station. Based on a first indicator of wireless link conditions associated with the first wireless device, and a second indicator of wireless link conditions associated with a second wireless device, a second amount of bandwidth is allocated to the first wireless device to send signal quality information to the base station.

A method of allocating signal quality feedback bandwidth to a plurality of wireless devices is disclosed. The plurality of wireless devices is grouped into a plurality of signal quality feedback bandwidth groups based on an indicator of signal quality feedback bandwidth associated with each of the plurality of signal quality feedback bandwidth groups. It is determined to allocate a first wireless device signal quality feedback bandwidth. The first wireless device not being a member of the plurality of wireless devices. A first group is selected from the plurality of signal quality feedback bandwidth groups. The first group is associated with a maximum indicator of signal quality feedback bandwidth of each of the plurality of signal quality feedback bandwidth groups. A second wireless device is moved from the first group to the second group based on an indicator of channel stability associated with the second wireless device. The first wireless device is added to the first group. Signal quality feedback bandwidth is allocated based on the second group and the first group.

A method of allocating signal quality feedback bandwidth to a plurality of wireless devices is disclosed. A grouping of the plurality of wireless devices into a plurality of signal quality feedback bandwidth groups based on an indicator of signal quality feedback bandwidth associated with each of the plurality of wireless devices is received. A first group associated with a minimum indicator of signal quality feedback bandwidth of each of the plurality of signal quality feedback bandwidth groups is selected. A first wireless device is moved from the first group to the second group based on an indicator of channel stability associated with the first wireless device. Signal quality feedback bandwidth is allocated based on the first group and the second group.

DETAILED DESCRIPTION

In an embodiment, channel conditions are taken into account in order to determine signal quality feedback bandwidth. Each wireless device is assigned an amount of signal quality feedback bandwidth. For example, a first wireless device may report received signal quality every frame. A second wireless device may report received signal quality every other frame. A third wireless device may report received signal quality every third frame, and so on.

The bandwidth that each wireless device is allocated is used to group the wireless devices. In other words, all the wireless devices that are reporting signal quality every frame are placed in one group. All the wireless devices that report signal quality every other frame are placed in another group, and so on.

When a new wireless device needs a signal quality feedback bandwidth, the group with the highest signal quality feedback bandwidth is selected (e.g., the group reporting signal quality every frame). From that selected group the wireless device with the best channel conditions is selected to be moved to a group with less signal quality feedback bandwidth (e.g., the group reporting signal quality every other frame).

The selected device is then moved into a lower bandwidth group and the new device is added to the higher bandwidth group. The groups are then used to allocate signal quality feedback bandwidth. In other words, the new device will be allocated signal quality feedback bandwidth at a rate associated with the high bandwidth group and the moved device will be allocated signal quality feedback bandwidth at a rate associated with the lower bandwidth group. Thus, when device is moved from a high bandwidth group to a lower bandwidth group it makes room for a new device to utilize a relatively large amount of signal quality feedback bandwidth. The selection of the device to move from high bandwidth group to the low bandwidth group is made based on a comparison of the channel conditions being experienced by the devices originally in the high bandwidth group.

In an embodiment, a standard deviation of the signal to noise ratio being experienced by a wireless device may be used as an indicator of the channel conditions. Thus, the device with the smallest standard deviation in the high bandwidth group may be selected to be moved to the lower bandwidth group. In this manner, the device with the most stable channel is selected from the group to be moved to a lower amount of signal quality feedback bandwidth.

Figure 1:
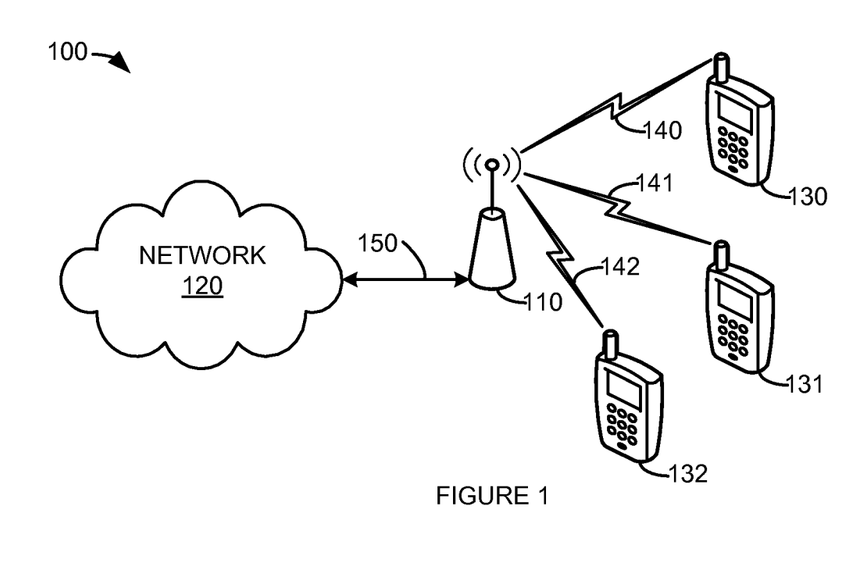
FIG. 1 is a block diagram illustrating communication system.

FIG. 1 is a block diagram illustrating a communication system. In FIG. 1, communication system 100 comprises base station 110, network 120, wireless device 130, wireless device 131, wireless device 132, wireless link 140, wireless link 141, wireless link 142, and backhaul link 150.

Wireless devices 130-132 may be operatively coupled to base station 110 by wireless links 140-142, respectively. Base station 110 is operatively coupled to network 120 via backhaul link 150. Thus, wireless devices 130-132 may be operatively coupled to network 120.

Wireless devices 130-132 may be any device, system, combination of devices, or other such communication platform capable of communicating with base station 110 via wireless links 140-142, respectively. Wireless devices 130-132 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links 140-142. Other types of communication platforms are possible.

Base station 110 may be any wireless system that provides the air interface to wireless devices 130-132, and communication connectivity to network 120 via backhaul link 150. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 120 may comprise a computer, a network, or a collection of computers and networks that couple, link, or otherwise operatively provide wireless devices 130-132 with communication service. It should be understood that network 120 may comprise secondary data networks. For example, network 120 may include a backhaul network, a local network, a long distance network, a packet network, or any combination thereof, as well as other types of networks. Network 120 may be or include an access service network (ASN), an access service network gateway (ASN-GW), wireless local access network access gateway (WAG), packet data gateway (PDG), mobile switching center (MSC) and packet data serving node (PDSN).

Wireless devices 130-132 may establish communication sessions with base station 110 in order to receive communication services via network 120, and via wireless links 140-142, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of data that can be exchanged via wireless links 140-142 depends upon air interface factors such as the number of wireless devices communicating via base station 110, interference, clutter, morphology, wireless device location, signal to interference and noise ratio (SINR) or carrier to interference and noise ration (CINR), and wireless device mobility. To account for these air interface variations, a wireless standard may specify the utilization of multiple modulation and coding schemes that are selected based on air interface conditions. This allows wireless devices with poor air interface conditions to utilize a low bit rate modulation with a high redundancy coding scheme. Wireless devices with good air interface conditions may utilize higher bit rate modulation with a low or no redundancy coding scheme. Thus, wireless devices with good air interface conditions can exchange more data with base station 110 in a given time (or symbol) and frequency block than a wireless device with poor air interface conditions. A time and frequency block may be referred to as a slot.

In order to select a correct transmit power, or modulation and coding scheme, a wireless standard may specify the ability to send signal quality information from wireless devices 130-132 to base station 110. For example, WiMAX specifies a channel quality indicator channel (CQICH) that may be used to provide air interface condition information (such as CINR or SINR) in an uplink slot to base station 110. The CQICH may be comprised of multiple slots thereby allowing multiple wireless devices to provide signal quality information to base station 110 in each frame.

Based at least partially on the signal quality information received from wireless devices 130-132, base station 110 may determine the modulation and coding level that should be used by wireless devices 130-132, respectively. Only a single wireless device 130, 131 or 132 may provide signal quality feedback in a particular uplink slot. Thus, in the case where there are many active wireless devices 130-132 registered with base station 110, the total number of slots allocated as CQICH slots creates a limit on the number of wireless devices 130-132 that base station 110 may support at any one time.

In an embodiment, base station 110 adaptively varies the gap between frames in which a signal quality feedback slot is allocated to a particular wireless device 130, 131 or 132. For example, base station 110 may allocate a first amount of bandwidth (i.e., number of slots or number of channels per second) that wireless device 130 may use to provide signal quality information to base station 110. Base station 110 may also allocate a second amount of bandwidth that wireless device 131 may use to provide signal quality information to base station 110.

Base station 110 may allocate the amounts of signal quality feedback bandwidth based on a grouping of wireless devices 130-132. The grouping of wireless devices 130-132, and thus the amount of bandwidth each wireless device 130-132 is allocated, may be dynamic. The grouping of wireless devices 130-132, and thus the amount of bandwidth each wireless device 130-132 is allocated, may be based on an indicator of signal quality associated with each of wireless devices 130-

132. The indicator of signal quality associated with each of wireless devices 130-132 may be associated with the stability of the corresponding wireless link 140-142.

The amount of bandwidth allocated to each of wireless devices 130-132 may be used to group wireless devices 130-132. In other words, all of the wireless devices 130-132 receiving the first amount of bandwidth may be assigned to a first group. All of the wireless devices 130-132 receiving the second amount of bandwidth may be assigned to a second group, and so on. In addition, the group to which any wireless device 130-132 is assigned may determine the amount of bandwidth allocated to that device. In other words, assigning wireless device 130 to the first group results in wireless device 130 being allocated to first amount of bandwidth. Assigning wireless device 131 second group results in wireless device 131 being allocated the second amount of bandwidth. Thus, if wireless device 132 were assigned to the first group it would be allocated the first amount of bandwidth, and if it were assigned to the second group it would be allocated the second amount of bandwidth.

When wireless device 132 registers with base station 110, wireless device 132 will need to be assigned signal quality feedback bandwidth. In an embodiment, base station 110 may move a wireless device 130 or 131 from one group to another in order to make signal quality feedback bandwidth available for allocation to wireless device 132. Moving either of wireless device 130 or 131 to a new group will result in wireless device 130 or 131 receiving a different allocation of signal quality feedback bandwidth. In an embodiment, base station 110 may select wireless device 130 or 131 based on an indicator of wireless link conditions associated with wireless device 130 or 131, respectively.

For example, assume that wireless device 130 and wireless device 131 are both in the first group. That is to say, they are allocated the same amount of signal quality feedback bandwidth. Also assume that the available amount of signal quality feedback bandwidth is fully allocated. When wireless device 132 seeks to register with base station 110, base station 110 may select wireless device 130 to be moved to the second group based on indicators of signal quality associated with wireless devices 130 and 131. In other words, if wireless device 130 is experiencing better signal conditions than wireless device 131, base station 110 may select wireless device 130 to be moved to a lower bandwidth group.

Base station 110 may select wireless device 130 to be moved to the lower bandwidth group because the better signal conditions that wireless device 130 is experiencing will allow wireless device 130 to provide signal quality feedback less often without a deterioration in service. Moving wireless device 130 to a lower bandwidth group frees up signal quality feedback bandwidth for wireless device 132 to use. Thus, wireless device 132 may be assigned to an appropriate group corresponding to the amount of signal quality feedback bandwidth base station 110 has available, or desires, to allocate to wireless device 132.

In another example, assume that wireless device 130 and wireless device 131 are grouped into different groups. When wireless device 132 seeks to register with base station 110, base station 110 determines that it needs to allocate signal quality feedback bandwidth to wireless device 132. First, base station 110 selects a group from which it will select a device to be moved to a different group. For example, base station 110 may select a first group that is associated with a maximum allocation of signal quality feedback bandwidth, and also has at least one wireless device as a member.

Once base station 110 has selected a group, base station 110 selects a wireless device from that group to be moved to another group. Base station 110 may select the wireless device based on indicator of channel stability associated with the selected wireless device as compared to the other wireless devices in that group. For example, base station 110 may select wireless device 130 from the first group because it is associated with the most stable channel conditions of all the wireless devices in the first group. An example of an indicator of channel stability is a standard deviation associated with a received CINR or SINR.

Base station 110 may then move wireless device 110 to another group. Base station 110 may add wireless device 132 to the first group. Base station 110 may then allocate signal quality feedback bandwidth based on the new assignment of wireless devices 130-132 to signal quality feedback bandwidth groups. In other words, wireless device 130 will be allocated less signal quality feedback bandwidth by virtue of being assigned to a lower bandwidth group. Wireless device 132 will be allocated the amount of signal quality feedback bandwidth previously allocated to wireless device 130 by virtue of being assigned to the first group.

In another example, consider a case where wireless devices 130-132 are already receiving allocations of signal quality feedback bandwidth. In this example, assume that wireless devices 130 and 131 are associated with a low bandwidth group (e.g., the second group, above), and wireless device 132 is associated with a higher bandwidth group (e.g., the first group, above). When wireless device 132 leaves base station 110, the allocation of signal quality feedback bandwidth in the first group previously used by wireless device 132 becomes available. Base station 110 then selects a wireless device 130 or 131 from the second group to be moved to the first group.

Base station 110 selects wireless device 130 to be moved to the first group based on an indicator of channel stability. Base station 110 may select wireless device 130 because it is associated with the least stable channel conditions of the wireless devices in the lower bandwidth group. Wireless device 130 is then moved to the higher bandwidth group and signal quality feedback bandwidth is allocated based on the new grouping. In addition, when wireless device 130 is moved from the second group to the first group, the allocation of signal quality feedback bandwidth in the second group previously used by wireless device 130 becomes available. Thus, base station 110 may repeat the process of selecting and moving wireless devices 130-132 between groups until there is little or no signal quality feedback bandwidth available in the highest bandwidth groups.

In an embodiment, base station 110 may adjust the amount of signal quality feedback bandwidth allocated to wireless device 130-132 by increasing or decreasing the number of slots per second. For example, if base station 110 is allocating wireless device 130 a signal quality feedback slot in each uplink frame, base station 110 may allocate a decreased amount of bandwidth by allocating wireless device 130 a signal quality feedback slot every other frame. This reduces the bandwidth allocated to wireless device 130 for signal quality feedback by half. Likewise, if base station 110 is allocating wireless device 130 signal quality feedback slot every third frame base station 110 may allocate an increased amount of bandwidth by allocating wireless device 130 a signal quality feedback slot every other frame.

Figure 2:
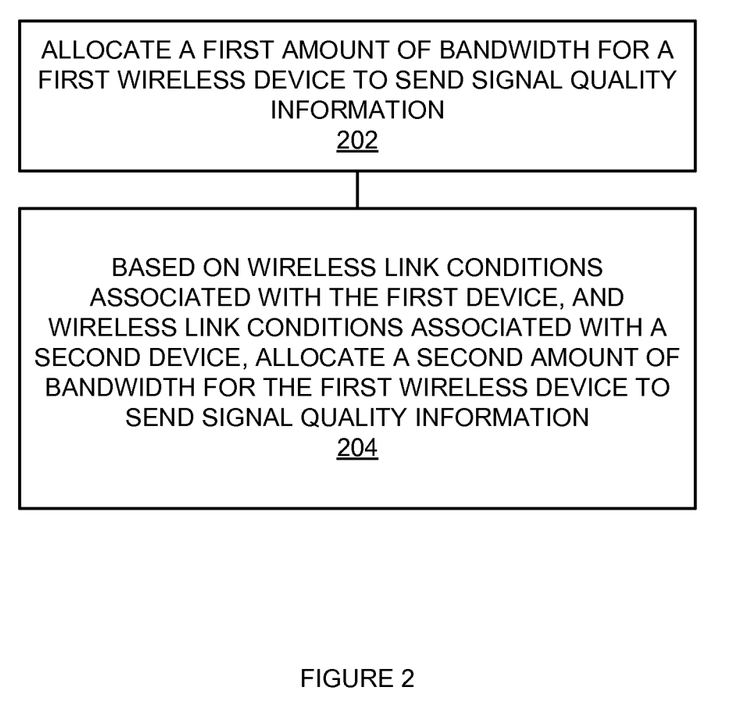
FIG. 2 is a flowchart illustrating method of allocating signal quality feedback bandwidth.

FIG. 2 is a flowchart illustrating method of allocating signal quality feedback bandwidth. The steps illustrated in FIG. 2 may be performed by one or more elements of communication system 100.

A first amount of bandwidth is allocated for a first wireless device to send the signal quality information (202). For example, base station 110 may allocate wireless device 130 a first amount signal quality feedback bandwidth. Based on wireless link conditions associated with the first device, and wireless link conditions associated with a second device, a second amount of bandwidth is allocated for the first wireless device to send a signal quality information (204). For example, when wireless device 132 registers with base station 110, base station 110 may reallocate the amount of bandwidth given to wireless device 130 for sending signal quality information.

This reallocation may be based on a wireless link conditions associated with the first device and the wireless link conditions associated with a second device. In other words, wireless device 130 may be selected to have some of its signal quality feedback bandwidth reassigned because it is experiencing better wireless link conditions than wireless device 131. Likewise, wireless device 131 may be selected to receive more signal quality feedback bandwidth because it is experiencing worse wireless link conditions than wireless 130.

Figure 3:
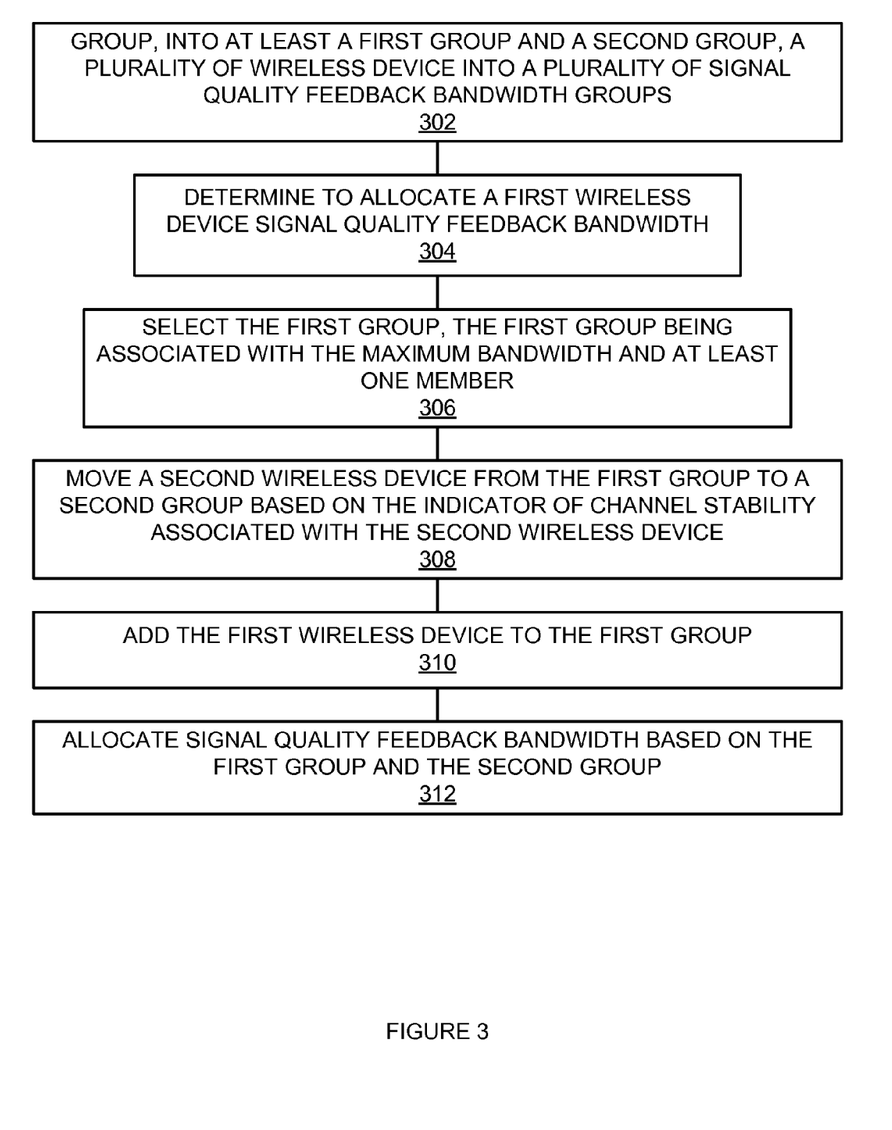
FIG. 3 is a flowchart illustrating a method of allocating signal quality feedback bandwidth to a plurality of wireless devices.

FIG. 3 is a flowchart illustrating a method of allocating signal quality feedback bandwidth. The steps illustrated in FIG. 3 may be performed by one or more elements of communication system 100.

A plurality of wireless devices are grouped into a plurality of signal quality feedback bandwidth groups. The plurality of signal quality feedback bandwidth groups include at least a first group and a second group (302). For example, base station 110 may group wireless device 130 into a first feedback bandwidth group. This first feedback bandwidth group may correspond to a certain amount of signal quality feedback bandwidth allocated to the wireless devices in this first group. For example, wireless device 130 may be grouped with all the other wireless devices on base station 110 that have been allocated a signal quality feedback slot every frame. Wireless device 131 may be grouped by base station 110 into a second feedback bandwidth group. This second feedback bandwidth group may correspond to a second amount of signal quality feedback bandwidth allocated to the wireless devices in the second group. For example, wireless device 131 may be grouped with all the other wireless devices on base station 110 that have been allocated a signal quality feedback slot every other frame, and so on.

It is determined to allocate a first wireless device signal quality feedback bandwidth (304). For example, base station 110 may, as a result of wireless device 132 registering with base station 110, determined to allocate signal quality feedback bandwidth to wireless device 132. The first group is selected. The first group is selected because it is associated with the maximum signal quality feedback bandwidth allocation for each device in the first group, and the first group has at least one member (306). For example, base station 110 may select the first group because it has at least one member (e.g., wireless device 130) and is associated with the maximum signal quality feedback bandwidth available being allocated to a wireless device 130-132 on base station 110 (e.g., a signal quality feedback slot in every frame).

A second wireless device is moved from the first group to a second group based on the indicator of channel stability associated with the second wireless device (308). For example, wireless device 130 may be moved from the first group to the second group because it is associated with the best indicator of channel stability of all the devices in the first group. In other words, wireless device 130 may be moved from the first group to the second group because all the other devices in the first group are associated with less stable channel conditions. Moving the second wireless device from the first group to the second group typically will free up a spot in the first group.

The first wireless device is added to the first group (310). For example, wireless device 132 may be added to the first group. Signal quality feedback bandwidth is allocated based on the first group and the second group (312). For example, wireless device 132 will be allocated a signal quality feedback slot in every frame by virtue of its membership in the first group (having replaced wireless device 130). Wireless device 130 is allocated a signal quality feedback slot in every other frame by virtue of its membership in the second group (having been moved to the second group from the first group in order to make room for wireless device 132).

Figure 4:
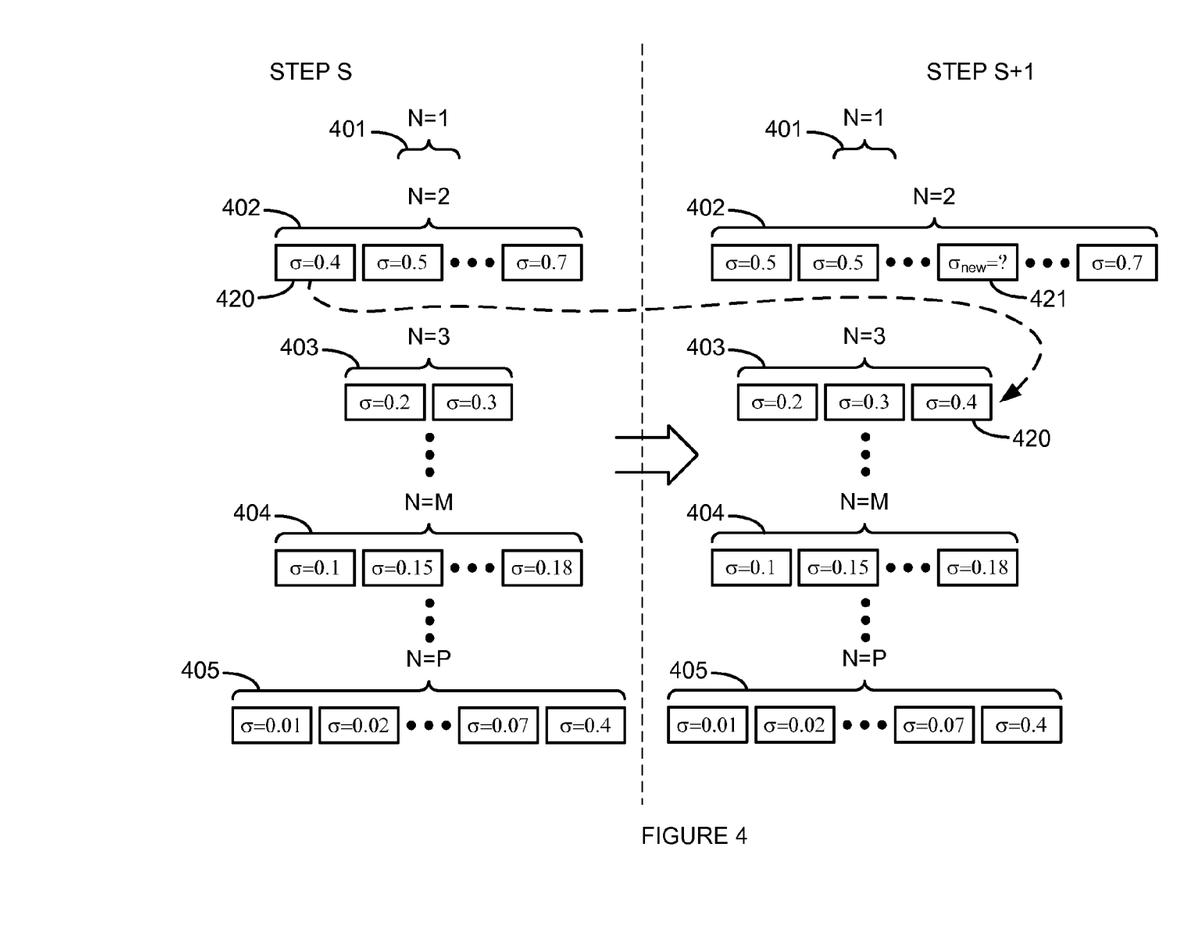
FIG. 4 is an illustration of adding a wireless device to a plurality of signal quality feedback bandwidth groups.

FIG. 4 is an illustration of adding a wireless device to a signal quality feedback bandwidth group. In FIG. 4, two steps are shown. Step S corresponds to the signal quality feedback bandwidth groups before a new device is added. Step S+1 corresponds to signal quality feedback bandwidth groups after a new device is added. The signal quality feedback bandwidth allocations shown in FIG. 4 may be seen as example allocations before (step S), and after (step S+1) the steps in FIG. 3 are performed.

FIG. 4 illustrates a plurality of signal quality feedback bandwidth groups. Each signal quality feedback bandwidth group is associated with a periodic allocation of a signal quality feedback slot. In other words, group 401, which is associated in FIG. 4 with N=1, illustrates a signal quality feedback bandwidth group whose members are allocated a signal quality feedback bandwidth slot every frame. Group 402, which is associated in FIG. 4 with N=2, illustrates a signal quality feedback bandwidth group whose members are allocated a signal quality feedback slot every other frame; Group 403, N=3, is allocated a slot every third frame; group 404, N=M, is allocated a slot every $M^{th}$ frame; and, group 405, N=P, is allocated a slot every $P^{th}$ frame, and so on.

In step S of FIG. 4, group 401 includes no devices. Group 402, includes device 420 associated with a standard deviation of 0.4 and several other devices associated with standard deviations ranging from 0.5 to 0.7. Group 403 includes two devices, one associated with a standard deviation of 0.2, and one associated with a standard deviation of 0.3. Group 404 includes devices associated with standard deviations ranging from 0.1 to 0.18. Group 405 includes devices associated with standard deviations of 0.01, 0.02, 0.07, and 0.04.

In step S+1 of FIG. 4, group 401 still includes no devices. Group 402, includes devices associated with standard deviations ranging from 0.5 to 0.7 and new device 421 which is not associated with any particular standard deviation. Group 403 now includes three devices: device 420, which is still associated with a standard deviation of 0.4, and the two devices that were in group 403 in step S. Group 404 and group 405 remain unchanged between step S and step S+1.

Thus, it can be seen from FIG. 4 that group 402 was selected because it had at least one member, and was associated with the maximum signal quality feedback bandwidth. It can also be seen that device 420 was selected because it was associated with the smallest standard deviation. Device 420 is moved to group 403 in step S+1 and the new device 421 is added to group 402 to be allocated signal quality feedback bandwidth slots every other frame.

Figure 5:
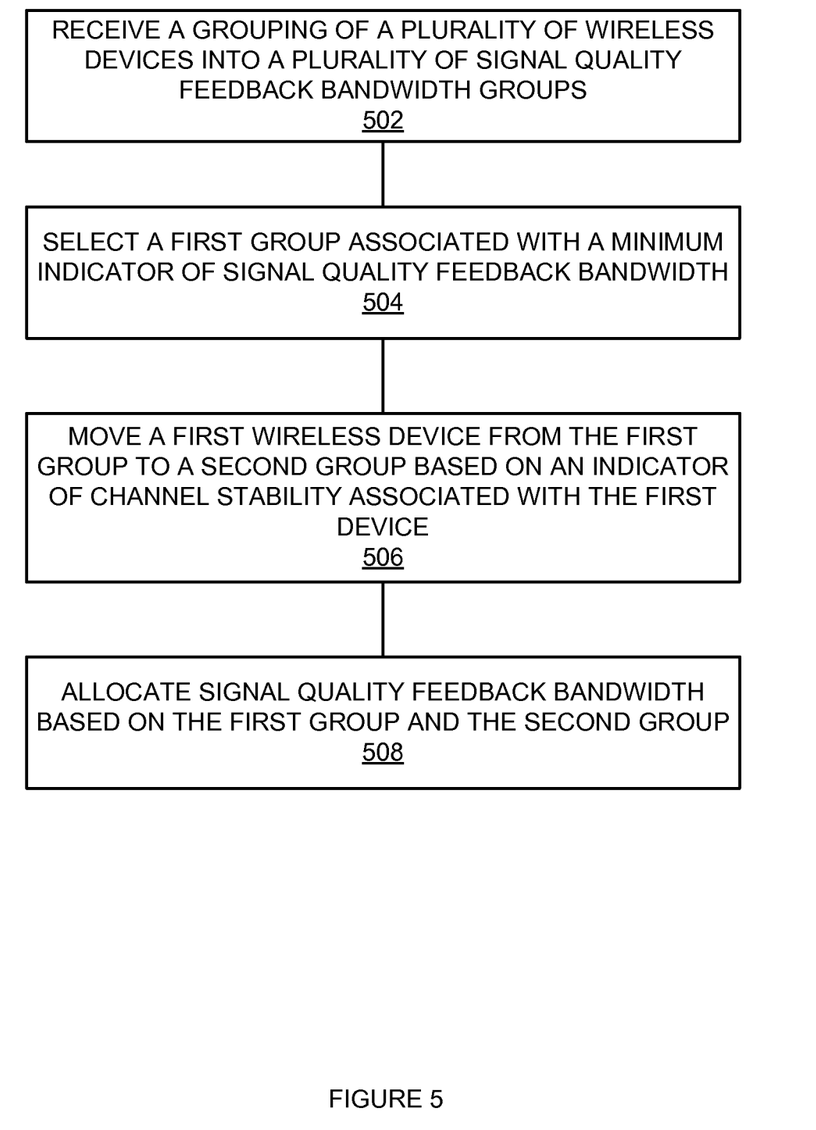
FIG. 5 is a flowchart illustrating a method of allocating signal quality feedback bandwidth to a plurality of wireless devices.

FIG. 5 is a flowchart illustrating a method of allocating signal quality feedback bandwidth to a plurality of wireless devices. The steps illustrated in FIG. 5 may be performed by one or more elements of communication system 100.

A grouping of a plurality of wireless devices into a plurality of signal quality feedback bandwidth groups is received (502). For example, base station 110 may have grouped wireless devices 130-132 into signal quality feedback bandwidth groups. A first group associated with a minimum indicator of signal quality feedback bandwidth is selected (504). For example, base station 110 may select a group associated with a low signal quality feedback bandwidth allocation. This group, for example, may include wireless devices 130-131.

A first wireless device is moved from the first group to a second group based on an indicator of channel stability associated with the first device (506). For example, a wireless device from the group selected in step 504 may be moved from that group to a higher bandwidth group because it is associated with the least stable channel conditions of that group. In another example, wireless device 130 is moved from a low bandwidth group to a higher bandwidth group because wireless device 130 is associated with a larger standard deviation than wireless device 131. Wireless device 130 may be eligible to be moved to a higher bandwidth group because wireless device 132 has left base station 110 thus freeing up signal quality feedback bandwidth in a higher bandwidth group.

Signal quality feedback bandwidth is allocated based on the first group and the second group (508). For example, signal quality feedback bandwidth may be allocated to wireless device 131 in an amount based on its membership in the first group. Signal quality feedback bandwidth may be allocated to wireless device 130 in an amount based on its membership in the second group.

Figure 6:
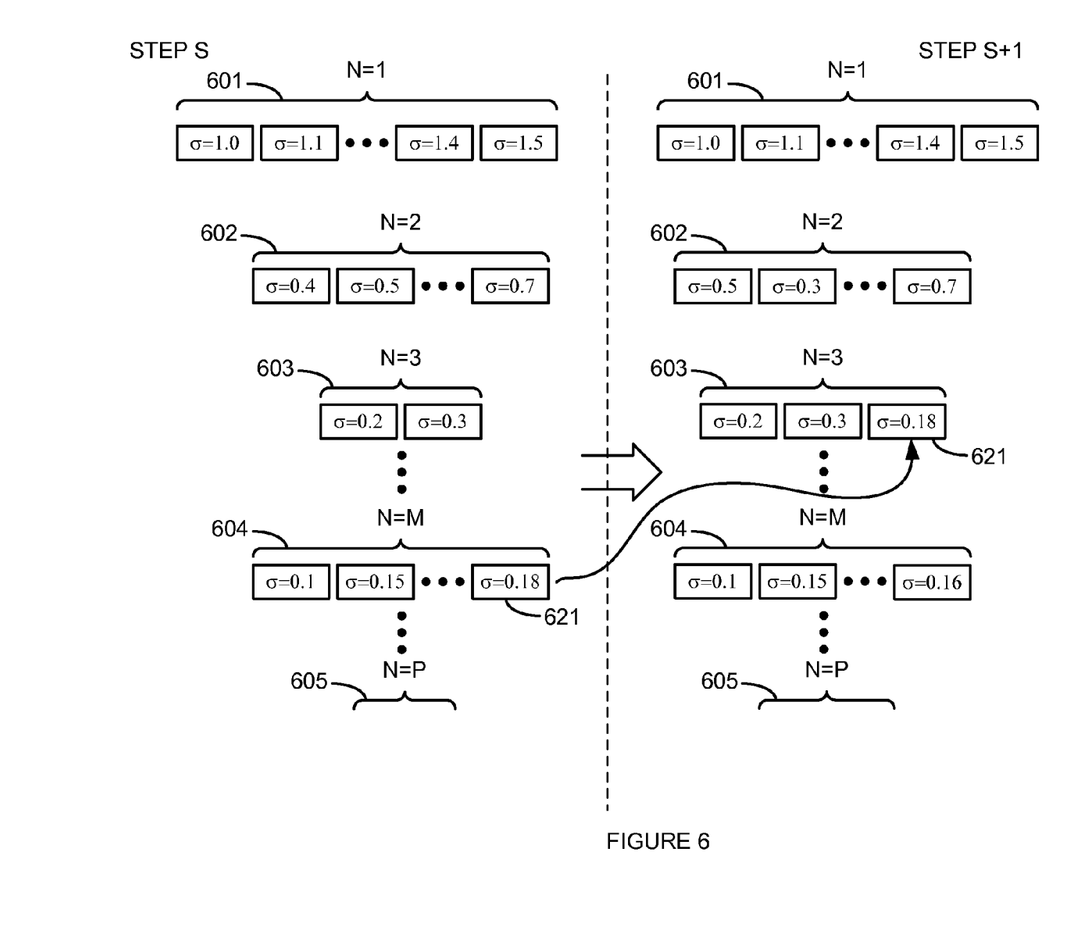
FIG. 6 is an illustration of moving a wireless device from a signal quality feedback bandwidth group to another signal quality feedback bandwidth group.

FIG. 6 is an illustration of moving a wireless device from a signal quality feedback bandwidth group to another signal quality feedback bandwidth group. In FIG. 6, two steps are shown. Step S corresponds to the signal quality feedback bandwidth groups before a device is moved. Step S+1 corresponds to signal quality feedback bandwidth groups after a device is moved. The signal quality feedback bandwidth allocations shown in FIG. 5 may be seen as example allocations before (step S), and after (step S+1), the steps in FIG. 5 are performed. The moving of devices between groups may be the result of signal quality feedback bandwidth becoming available.

FIG. 6 illustrates a plurality of signal quality feedback bandwidth groups. Each signal quality feedback bandwidth group is associated with a periodic allocation of a signal quality feedback slot. In other words, group 601, which is associated in FIG. 6 with N=1, illustrates a signal quality feedback bandwidth group whose members are allocated a signal quality feedback bandwidth slot every frame. Group 602, which is associated in FIG. 6 with N=2, illustrates a signal quality feedback bandwidth group whose members are allocated a signal quality feedback slot every other frame; Group 603, N=3, are allocated a slot every third frame; group 604, N=M, are allocated a slot every $M^{th}$ frame; and, group 605, N=P, are allocated a slot every $P^{th}$ frame, and so on.

In step S of FIG. 6, group 601 includes devices associated with standard deviations from 1.0 to 1.5. Group 602, devices associated with standard deviations ranging from 0.4 to 0.7. Group 603 includes two devices, one associated with a standard deviation of 0.2, and one associated with a standard deviation of 0.3. Group 604 includes devices associated with standard deviations ranging from 0.1 to 0.18. Device 621 in group 604 is associated with a standard deviation of 0.18. Group 605 includes no devices.

In step S+1 of FIG. 6, group 601 still includes devices associated with standard deviations from 1.0 to 1.5. Group 602, includes devices associated with standard deviations ranging from 0.4 to 0.7. Group 603 now includes device 621 with a standard deviation of 0.18. Group 604 now includes devices associated with standard deviations ranging from 0.1 to 0.16. Group 605 still includes no devices.

Thus, it can be seen from FIG. 6 that group 604 was selected because it had at least one member, and was associated with the minimum signal quality feedback bandwidth. It can also be seen that device 621 was selected because it was associated with the largest standard deviation of group 604. Device 621 is moved to group 603 in step S+1 to be allocated signal quality feedback bandwidth slots every third frame instead of every $M^{th}$ frame.

Figure 7:
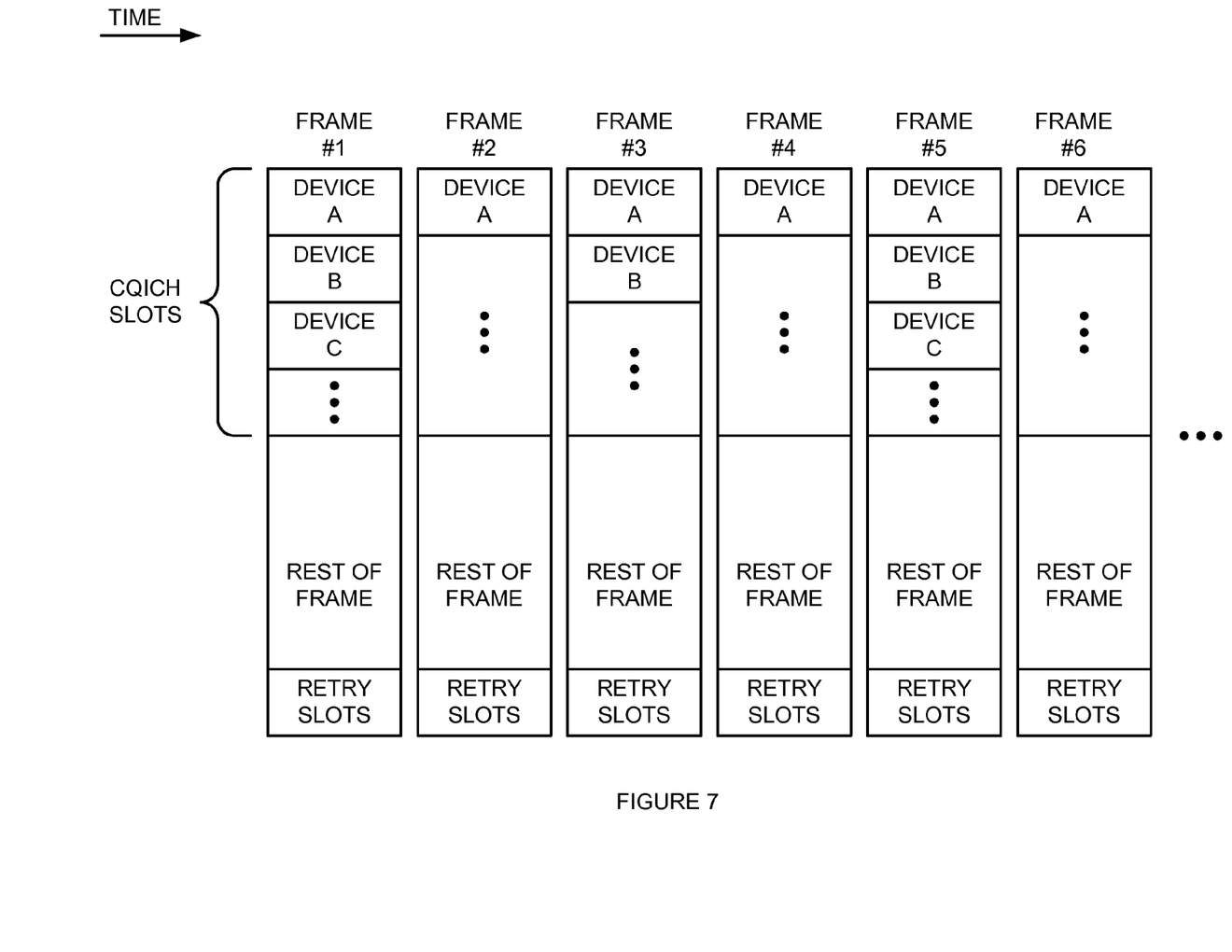
FIG. 7 is an illustration of an allocation of signal quality feedback slots.

FIG. 7 is an illustration of an allocation of signal quality feedback slots. The frames and signal quality feedback slot allocations depicted in those frames may be generated by one or more elements of communication system 100.

FIG. 7 illustrates a sequence of frames 1-6. Each frame has three parts, a CQICH part, a retry part, and the rest of the frame. In the CQICH part of frame 1, Device A, Device B, and Device C each are allocated a CQICH slot. In the CQICH part of frame 2, only Device A is allocated a CQICH slot. In the CQICH part of frame 3, Device A and Device B are each allocated a CQICH slot. In the CQICH part of frame 4, only Device A is allocated a CQICH slot. In the CQICH part of frame 5, Device A, Device B, and Device C each are allocated a CQICH slot. In the CQICH part of frame 6, only Device A is allocated a CQICH slot. The allocations of CQICH slots illustrated in FIG. 7 may correspond to allocations of signal quality feedback bandwidth as controlled by the signal quality feedback bandwidth groups discussed previously. In this case, Device A would be associated with the highest signal quality feedback bandwidth group. Device B would be associated with a medium signal quality feedback bandwidth group. Device C would be associated with the lowest signal quality feedback bandwidth group.

Table 1 details steps that may be used to allocate and re-allocate devices to signal quality feedback bandwidth groups.

TABLE 1

$u_G(i)$: A set of active wireless devices reporting a signal quality indicator every i frame ($i = 2^p$) in group G
where G = Gch if channel is stable, otherwise Bch. (e.g., $u_G(1)$ is a set of active MS reporting every frame,
$u_G(2)$ is a set of reporting every two frames.)
$s(t)$ : System state at time t
$N^+$: System state that number of active wireless devices is increased
$N^-$: System state that number of active wireless devices is decreased K: A set of all active wireless devices, i.e., $K = \bigcup_{i>0} u_G(i)$ $\sigma_k$: Standard Deviation reported from wireless device $k \in K$
$\delta, \Delta$: Constant $\geq 1$
Step1) Check $s(t)$
 Step1.1) If $s(t) \notin N^+$, Go to Step1.3)
  Step1.1.1) Choose a wireless devices $$k^\circ = \arg\min_{k \in u_{Gch}(i^\circ)} \{\sigma_k\} \text{ where } i^\circ = \min\{i \mid |u_{Gch}(i)| > 0\}$$

Step1.1.2) $k^\circ \rightarrow u_{Gch}(i + \delta)$, $u_{Gch}(i^\circ) = u_{Gch}(i^\circ) - k^\circ$, $k^{new} \rightarrow$
  $u_{Bch}(i + \delta)$ or $u_{Gch}(i^\circ)$ where $k^{new}$ is a newly active wireless device.
 Step1.1.3) Repeat Step1.1.1) and Step1.1.2) until there are no more new wireless devices
 Step1.2) Go to Step1)
 Step1.3) (If $s(t) \in N^-$)
  Step1.3.1) Choose a wireless device $$k^* = \arg\min_{k \in u_{Bch}(i^*)} \{\sigma_k\} \text{ where } i^* = \max\{i \mid |u_{Bch}(i)| > 0\}$$

TABLE 1-continued

Step1.3.2) $k^* \to u_{Bch}(i^* - \Delta), u_{Bch}(i^*) = u_{Bch}(i^*) - k^*$
Step1.3.3) Repeat Step1.3.1) and Step1.3.2) until there is no more available signal quality feedback bandwidth
Step1.4) Go to Step1)

Figure 8:
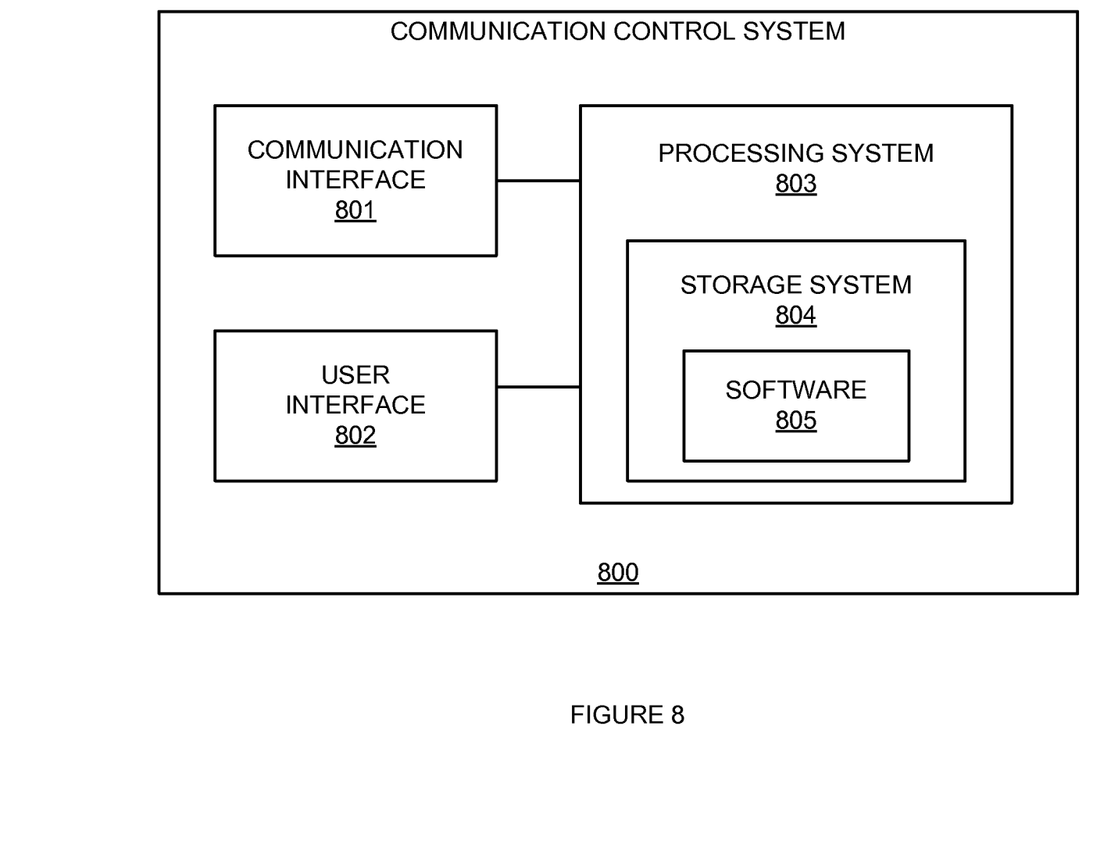
FIG. 8 is a block diagram of a communication control system.

FIG. 8 illustrates communication control system 800. Communication control system 800 is an example of components of base station 110 that may be used to implement the methods and algorithms described previously. Communication control system 800 comprises communication interface 801, user interface 802, and processing system 803. Processing system 803 is linked to communication interface 801 and user interface 802. Processing system 803 includes storage system 804 that stores software 805.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing system 803 may comprise a microprocessor and other circuitry that retrieves and executes software 805 from storage system 804. Storage system 804 may comprise a disk drive, flash drive, data storage circuitry, or some other memory apparatus. Software 805 comprises computer programs, firmware, or some other form of machine-readable processing instructions. Software 805 may include an operating system, utilities, drivers, network interfaces, applications, or some other type of software. When executed by processing system 803, software 805 directs processing system 803 to operate communication control system 800 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating signal quality feedback bandwidth, comprising:
allocating, by a node of a communication network, a first amount of bandwidth for a first wireless device to send signal quality information to a base station;
receiving a first indicator of wireless link conditions associated with the first wireless device, wherein the first indicator is based on a standard deviation of RF conditions of the wireless link associated with the first wireless device;
receiving a second indicator of wireless link conditions associated with a second wireless device, wherein the second indicator is based on a standard deviation of RF conditions of the wireless link associated with the second wireless device; and,
allocating, by the node of the communication network, a second amount of bandwidth for the first wireless device to send signal quality information to the base station based on the first indicator associated with the first wireless device and the second indicator associated with the second wireless device.

2. The method of claim 1, wherein the first indicator of wireless link conditions is associated with a stability of wireless link conditions.

3. The method of claim 1, wherein the first indicator of wireless link conditions is received from the first wireless device.

4. The method of claim 3, wherein the first indicator of wireless link conditions is based on a standard deviation of an indicator of signal to noise ratio being experienced by the first wireless device.

5. The method of claim 1, wherein the first indicator of wireless link conditions is associated with a received signal strength indication.

6. The method of claim 1, wherein allocating the second amount of bandwidth is further based on a change in a number of wireless devices sharing signal quality feedback bandwidth.

7. The method of claim 1, wherein allocating the second amount of bandwidth is further based on a total number of wireless devices sharing an allocation of signal quality feedback bandwidth.

8. The method of claim 1, wherein the second amount of bandwidth is allocated to the first wireless device when the standard deviation of the RF conditions of the wireless link associated with the first wireless device is less than the standard deviation of RF conditions of the wireless link associated with the second wireless device.

* * * * *